United States Patent [19]
Hunter et al.

[11] Patent Number: 5,559,648
[45] Date of Patent: Sep. 24, 1996

[54] METHOD FOR OPTIMIZING TRACK LOCATION DURING SERVO WRITING

[75] Inventors: Dan A. Hunter, Boulder; Michael R. Utenick, Niwot; James H. Morehouse, Jamestown; Nelson Chenkin, Ft. Collins, all of Colo.

[73] Assignee: Integral Peripherals, Inc., Boulder, Colo.

[21] Appl. No.: 106,264

[22] Filed: Aug. 13, 1993

[51] Int. Cl.$^6$ .................................................. G11B 5/596
[52] U.S. Cl. .......................................... 360/75; 360/78.08
[58] Field of Search ............................. 360/78.08, 78.11, 360/78.13, 53, 75

[56] References Cited

U.S. PATENT DOCUMENTS

| | | | |
|---|---|---|---|
| 4,614,986 | 9/1986 | LaBudde | 360/78.05 |
| 4,630,145 | 12/1986 | Thompson et al. | 360/78.05 X |
| 4,703,371 | 10/1987 | Redmond et al. | 360/75 |
| 4,878,618 | 10/1989 | Ide et al. | 360/78.13 |
| 4,933,785 | 6/1990 | Morehouse et al. | 360/78.04 |
| 4,935,835 | 6/1990 | Godwin et al. | 360/77.07 X |
| 4,949,202 | 8/1990 | Kim | 360/78.14 |
| 5,041,924 | 8/1991 | Blackborow et al. | 360/75 X |

*Primary Examiner*—Aristotelis Psitos
*Assistant Examiner*—James T. Wilson
*Attorney, Agent, or Firm*—Skjervan, Morrill, MacPherson, Franklin & Friel

[57] ABSTRACT

A method for optimizing the storage capacity of miniature disk drives without affecting reliability or yields of the disk drives uses an iterative seek process to define track zero. Initially, a physical reference point is defined and a transducer is moved in coarse steps from the physical reference point until interference with a stationery loading ramp or other mechanical component, hereinafter, "ramp," is detected. Upon detection of interference, the transducer is moved one coarse step away from the ramp and then the transducer is moved in fine steps towards the ramp until interference is again detected. Upon detection of interference, the transducer is moved away from the ramp a predetermined distance. After the transducer is moved the predetermined distance, a check is made for interference. If interference is detected, the transducer is moved in fine step towards the center of the disk until interference is no longer detected. When interference is no longer detected, the transducer is moved a predetermined distance and the resulting location of the transducer is defined as track zero.

31 Claims, 5 Drawing Sheets

METHOD FOR OPTIMIZING TRACK LOCATION DURING SERVO WRITING

BACKGROUND OF THE INVENTION

1. Field of the Invention

This invention relates generally to the storage of information on hard disk drives and more particularly to a method for optimizing the storage capacity of miniature disk drives.

2. Description of the Prior Art

In miniature disk drives, the transducers are preferably loaded into, and unloaded from flight above the surface of the spinning magnetic storage media, as opposed to utilizing take-off from and landing on the magnetic storage media. Loading and unloading of the transducers above, as opposed to on, the storage media is referred to as dynamic head loading.

For a more detailed discussion of dynamic head loading, see U.S. Patent application Ser. No. 07/766,479, entitled "Rigid Disk Drive with Dynamic Head Loading Apparatus" of James H. Morehouse et al., which issued as U.S. Pat. No. 5,237,472 on Aug. 17, 1993, and U.S. patent application Ser. No. 07/629,957, entitled "Rigid Disk Drive with Dynamic Head Loading Apparatus" of James H Morehouse et al. which issued as U.S. Pat. No. 5,289,325 on Feb. 22, 1994, both of which are incorporated herein by reference in their entirety. See also, U.S. Pat. No. 4,933,785, entitled "Disk Drive Apparatus Using Dynamic Loading/Unloading" which issued to Morehouse et al., on Jun. 12, 1990 and U.S. Pat. No. 5,027,241, entitled "Data Head Load Beam for Height Compacted, Lower Power Fixed Head and Disk Assembly" which issued to Hatch et al. on Jun. 25, 1991.

In the various different embodiments of dynamic head loading, a transducer 11 (FIG. 1), alternatively referred to as the read/write head, magnetic head, or slider, is affixed to a load beam 10 which in turn is affixed to a rotary actuator 6. The accuracy with which the structure is made is limited by mechanical manufacturing tolerance.

The load beam-transducer assembly is moved into contact with or from a stationery loading ramp 15 to dynamically load or unload, respectively, the load beam-transducer assembly. Stationery loading ramp 15 typically encroaches over the outer diameter of storage media 2, i.e., a disk or disks.

When transducer 11 is unloaded from stationery loading ramp 15, prerecorded servo patterns on disk 2 are used to accurately locate information in a particular track or tracks on disk 2. The prerecorded servo patterns are written on a disk using a servo track writer (STW), that can precisely position transducer 11. However, as the capacity of miniature disk drives is increased and as disk drives are made smaller while maintaining the same storage capacity, there is a need for even more precise positioning of the servo patterns so that the number of tracks on each surface of the disk can be optimized.

In disk drives that utilize dynamic head loading, stationery loading ramp 15 in combination with the mechanical manufacturing tolerances and disk runout limit the accuracy of the servo track writer. Specifically, as the servo track writer positions transducer 11 near the outer diameter of disk 2, transducer 11 may encounter interference from stationery loading ramp 15. Therefore, to the extent that stationery loading ramp 15 encroaches over the outer diameter of disk 2, the usable disk area, and consequently the available recording area, is reduced.

The problem associated with stationery loading ramp 15 is further exacerbated by the mechanical manufacturing tolerances associated with the positioning of stationery loading ramp 15 relative to the outer diameter of disk 2, and the positioning of the magnetic heads, e.g., transducer 11, on the load beams relative to stationery loading ramp 15. For disk drives with multiple magnetic heads, the variation in the various magnetic heads' position relative to stationery loading ramp 15 creates a high probability that at least one magnetic head encounters interference from stationery loading ramp 15 as the servo track writer writes the tracks on the outer diameter of the disk.

If a magnetic head 11 (FIG. 1) encounters interference from stationery loading ramp 15, i.e., ramp 15 starts to unload magnetic head 11, the servo field information is not completely written at the proper location on disk 2 by the servo track writer. Consequently, to assure that each track was properly written, the servo track writer was programmed to compensate for the mechanical manufacturing tolerances. Specifically, a reference track, which is commonly referred to as track zero, was written a predetermined distance from the outer disk diameter. The predetermined distance was calculated using worst case mechanical tolerances. Subsequently, the servo track writer moved radially in from track zero and sequentially formatted each track with the servo field information.

Placement of track zero based on the worst case mechanical manufacturing tolerances leaves usable disk space unutilized and so the effective data storage capacity of the disk drive is reduced. Alternatively, track zero can be moved closer to the outer diameter. Moving track zero closer to the outer diameter increases the effective data storage capacity, but only at the expense of decreased reliability and yields. Therefore, a method is needed that increases the effective data storage without decreasing reliability and yields.

SUMMARY OF THE INVENTION

According to the principles of this invention, a novel method is used to locate track zero on a disk so that the storage capacity of the disk is optimized, i.e, the effective data storage of the disk is increased relative to prior art methods, without decreasing reliability and yields. In one embodiment, an iterative seek method is utilized. Initially, a physical reference point is defined and a transducer is moved in coarse steps from the physical reference point until interference with a stationary loading ramp or other mechanical component, hereinafter, "ramp," is detected.

Upon detection of interference with the ramp, the transducer is moved one coarse step away from the ramp and then the transducer is moved in fine steps towards the ramp until interference is again detected. Upon detection of interference, the transducer is moved a predetermined distance away from the ramp and then a check is made for interference with the ramp. If no interference is detected, the location of the transducer is defined as absolute track zero, hereinafter track zero. Conversely, if interference is detected, the transducer is moved in fine steps towards the center of the disk until interference is no longer detected. When interference is no longer detected, the location of the transducer is defined as track zero.

More specifically, the method of this invention for optimizing the storage capacity of a disk drive includes the steps of:

A) moving a transducer a first predetermined increment in a first direction;

B) measuring whether a mechanical component of said disk drive interfered with movement of said transducer in said first direction;

C) performing step D) if interference is not detected in step B) and otherwise branching to step F)

D) repeating steps A) and B) until step B) detects interference with movement of said transducer in said first direction;

E) defining a reference track zero after detection of interference by said mechanical component with movement of said transducer in said first direction and terminating said method;

F) moving said transducer a second predetermined increment in a second direction wherein said second direction is opposite to said first direction;

G) measuring whether said mechanical component of said disk drive continues to interfere with said transducer;

H) repeating steps F) and G) until step G) detects no interference with said transducer; and I) defining said reference track zero after detection of no interference and terminating said method.

Unlike prior art processes that placed track zero at the same location in each disk drive, the process of this invention locates track zero a given number of tracks radially in from the stationery loading ramp. Consequently, the storage capacity of the disk drive is enhanced without comprising yields or reliability. Moreover, the process of this invention always gives the optimal storage capacity independent of the mechanical manufacturing tolerances.

DETAILED DESCRIPTION

Figure 1:
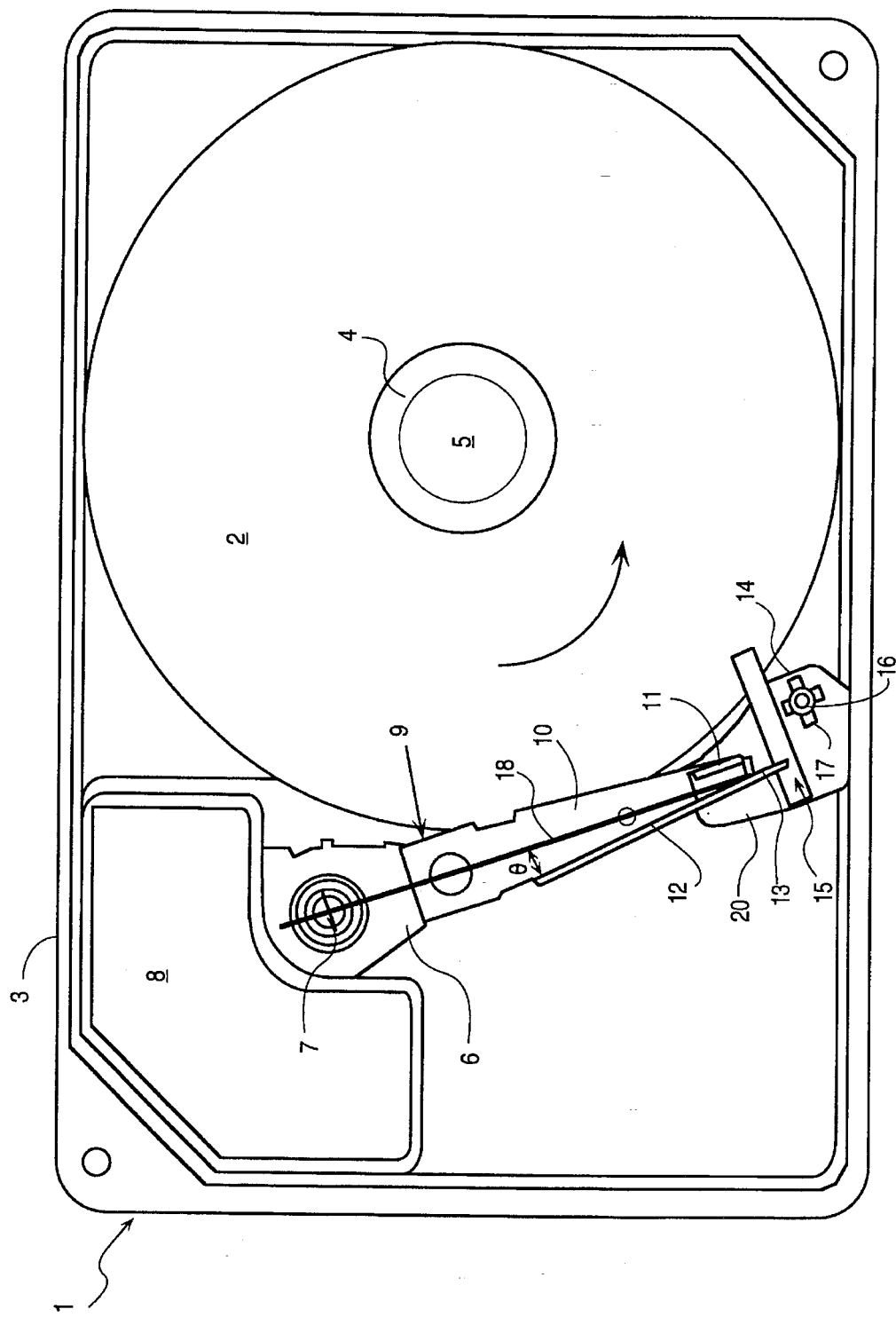
FIG. 1 is a top plan view of a rigid disk drive incorporating a dynamic head loading apparatus.

According to the principles of this invention, a novel method is used to optimize the location of track zero on a disk. The novel method defines the location of track zero so that in subsequent formatting of the disk, the maximum disk storage capacity is utilized for each disk drive irrespective of the mechanical manufacturing tolerances for that disk drive. The method provides the maximum disk storage capacity without sacrificing either reliability or yields.

In one embodiment, a servo track writer is programmed to power the actuator so that the magnetic heads are forced against an inner crash stop of the disk drive to thereby establish a known physical reference point. Alternatively, the servo track writer is programmed to position the magnetic heads at a reference point away from the stationery loading ramp, i.e., at a position called the home position. The servo track writer uses an absolute position as the home position.

The servo track writer moves the magnetic heads radially outward from the physical reference point until the magnetic heads move into a zone where interference from the stationery loading ramp is possible. In one embodiment, the zone of possible interference with the stationery loading ramp is determined using the worst case mechanical manufacturing tolerances.

When the zone of possible interference is reached, a ramp test is performed. In the ramp test, the magnetic heads are used to write a known pattern, e.g. a clock pattern, on each surface of the disk. Each magnetic head then reads the information, i.e., the pattern, just written on the disk surface. If the patterns are read correctly by all the magnetic heads, no magnetic head has encountered interference from the stationery loading ramp. Conversely, if one or more of the magnetic heads fail to read the pattern correctly, interference has occurred with the magnetic head or the magnetic head is defective. The steps taken if interference is detected in this first ramp test are described below. In either case, the ramp test measures whether the magnetic heads encountered interference with the stationery loading ramp.

If no interference is detected in the first ramp test, the servo track writer moves the magnetic heads radially outward a first predetermined number of tracks, i.e., a coarse step is taken, and then the ramp test is repeated. If no interference is detected, the magnetic heads are moved the first predetermined number of tracks again, e.g. 10 tracks, and the ramp test is repeated. In this process, when one or more magnetic heads fail to read the pattern correctly in the ramp test, the magnetic heads are moved in a coarse step a second predetermined number of tracks radially in, i.e., moved a predetermined distance in a second direction, by the servo track writer. (Herein, "a predetermined distance" is sometimes referred to as "a predetermined increment.") The fine adjustment steps in the process of this invention after this move in the second direction are described more completely below.

If interference is not detected after a coarse radially outward step, the magnetic heads are again moved radially outward the first predetermined number of tracks and the ramp test is repeated. This process continues until either a predetermined number of coarse steps of the first predetermined number of tracks have been made, or interference is detected. When the predetermined number of coarse steps has been performed radially outward from the physical reference point, an error condition exists, e.g., the stationery loading ramp cannot be found and the process is terminated.

When interference is detected in the first ramp test, the magnetic heads are moved in a coarse step the second predetermined number of tracks radially inward by the servo track writer and the ramp test is repeated. If interference is detected, the magnetic heads are again moved radially inward the second predetermined number of tracks and the ramp test is repeated. This process continues until either a predetermined number of radially inward steps of the second predetermined number of tracks have been made, or no interference is detected. In this part of the process, when the predetermined number of number of steps has been performed, an error condition exists, e.g., one or more of the magnetic heads are defective and the process is terminated. When no interference is detected after the magnetic heads are moved in the second direction, the coarse adjustments are complete and the fine adjustments are started.

In starting the fine adjustments, the servo track writer is used to step the magnetic heads radially outward, one track at a time, i.e., a third predetermined number of tracks. After each step, the ramp test is repeated. When interference is detected, the magnetic heads are moved radially in a fourth predetermined distance, e.g., about twenty tracks. The fourth predetermined distance is defined by mechanical tolerances of the disk drive. For example, track zero must be defined so that during operation of the disk drive thermal expansion and/or disk runout does not cause track zero to move such that prior to reaching track zero, the magnetic heads encounter interference from the stationery loading ramp.

After the magnetic heads are moved the fourth predetermined distance, the ramp test is repeated. If interference is detected the magnetic heads are stepped in a fifth predetermined number, e.g., one track, and the ramp test is repeated. The magnetic heads are moved radially inward, i.e., in the second direction, in steps of the fifth predetermined size and the ramp test repeated until no interference is detected. The track, over which the magnetic heads are positioned, when no interference is detected, is designated "track zero".

The combination of the coarse seek of this method that is used to locate the loading ramp, and the fine seek that is used to define the location of track zero after the position of the loading ramp is determined provides the optimized storage capacity for all variations in manufacturing tolerances. Specifically, the method of this invention includes the steps of: moving a transducer in predetermined increments in a first direction; measuring after each predetermined increment whether a mechanical component, e.g., the stationery loading ramp, of the disk drive interfered with movement of the transducer in the first direction; defining a reference track zero after detection of interference by the mechanical component with movement of the transducer in the first direction.

A more detailed diagram of process 200 of this invention is illustrated in FIGS. 2A to 2D. In initialize step 202 (FIG. 2A), two limits are set for the number of iterations that are performed in various steps of method 200 and a counter is initialized. Herein, a first limit is represented by the integer m and a second limit is represented by the integer n. Limit m is preferably five and limit n is preferably ten, in one embodiment. Processing transfers from initialize step 202 to define reference point 204.

In define reference point step 204, a known physical reference point, referred to as "home" is established, as explained above.

Processing transfers from define reference point step 204 to move in first direction to possible interference zone step 206. In step 206, the servo track writer moves the magnetic heads radially outward, i.e, in a first direction, from the physical reference point to the start of a zone of possible interference. As explained above, the possible interference zone is defined by considering the worst case mechanical manufacturing tolerances for the stationery loading ramp, and for affixing the magnetic heads to the flexures and the flexures to the actuator.

In one embodiment, the start of the zone of possible interference is estimated by the following equation:

$$ZPI=(x-a-b-c-d)$$

ZPI=distance in millimeters (mm) from physical reference point to zone of possible interference;

x=nominal distance in mm from the physical reference point to the edge of the stationery loading ramp;

a=manufacturing tolerance for attachment of stationery loading ramp to disk drive in mm;

b=manufacturing tolerance for staking magnetic head to load beam in mm;

c=manufacturing tolerance for vertical height of stationery loading ramp in mm; and d=other manufacturing tolerance for magnetic head-load beam assembly relative to the spindle such as actuator or head arm tolerance.

When the magnetic heads reach the zone of possible interference, ramp test step 208 is performed. In ramp test 208, each magnetic head is used to write a pattern on the disk and then each magnetic head is used to read the pattern that the magnetic head wrote. Processing transfers from ramp test step 208 to interference check step 210.

Note that herein when a head fails to read the written pattern, this is referred to as "interference." In view of this disclosure, the source of the interference will be clear. Moreover, those skilled in the art will understand that the pattern will not be read successfully if there is a disk defect under the transducer. When limits n and m are selected as described below, such disk defects should not affect process 200.

Figure 2A:
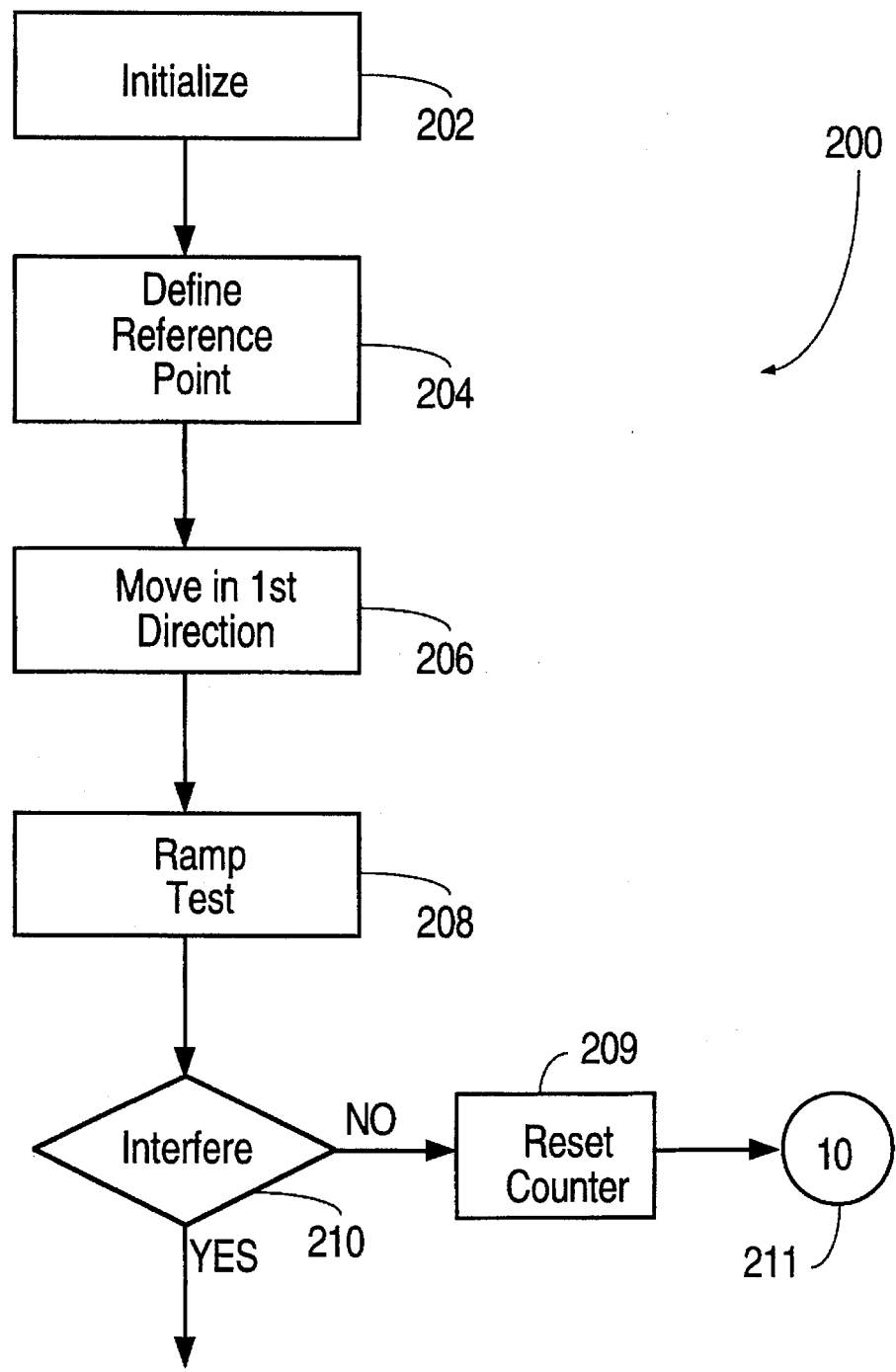
FIGS. 2A to 2D are a flow diagram for one embodiment of the process of this invention.
Figure 2B:
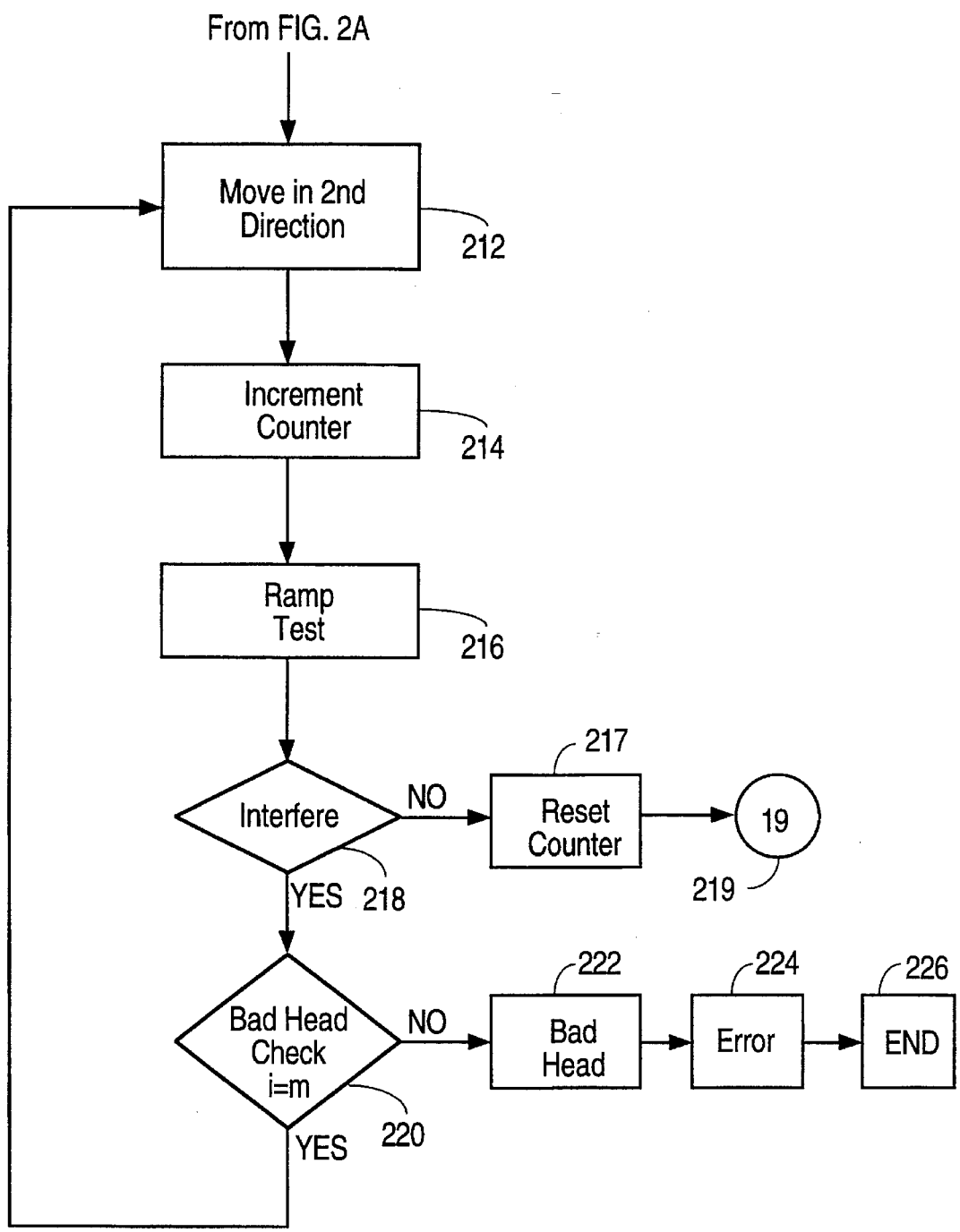
Figure 2C:
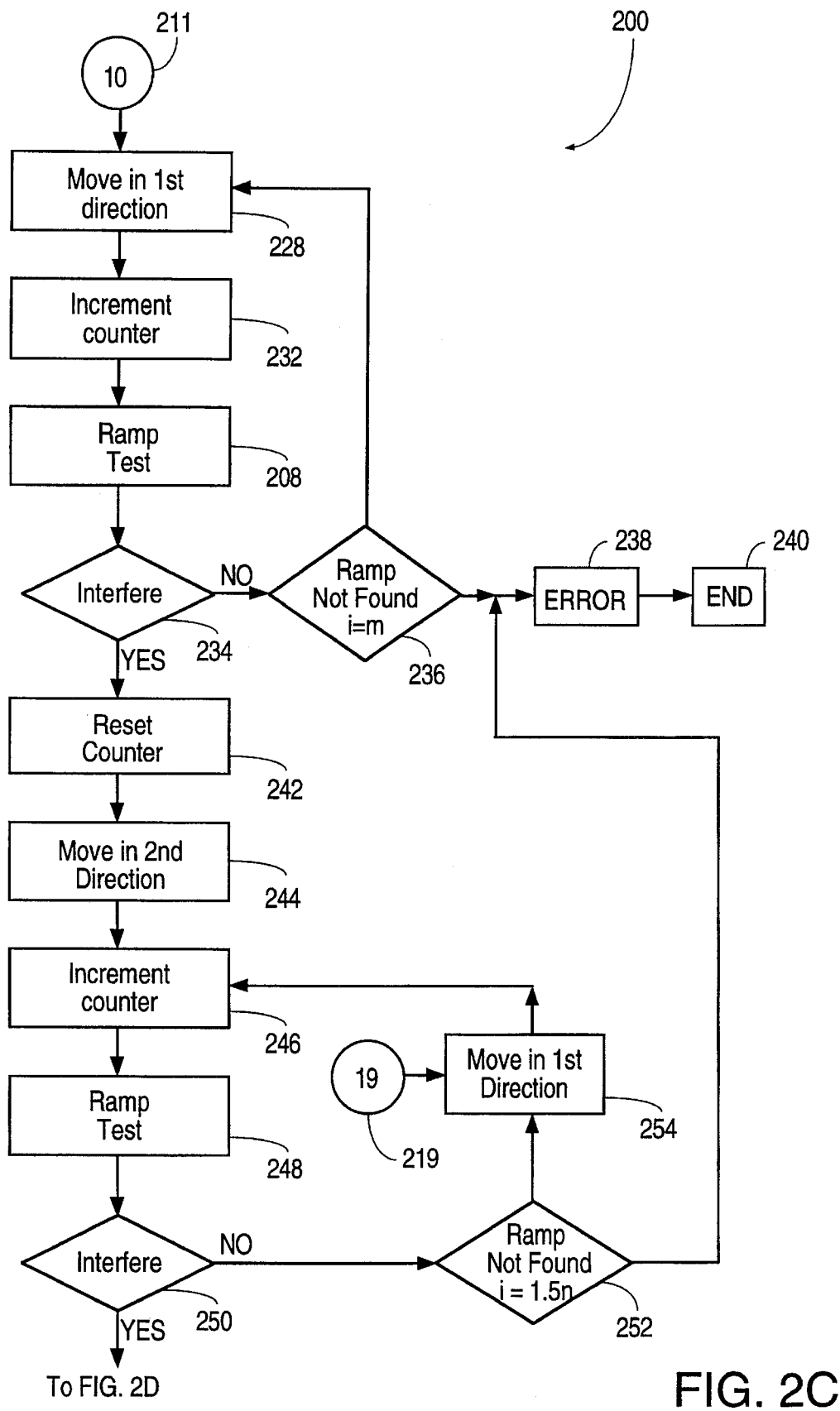
Figure 2D:
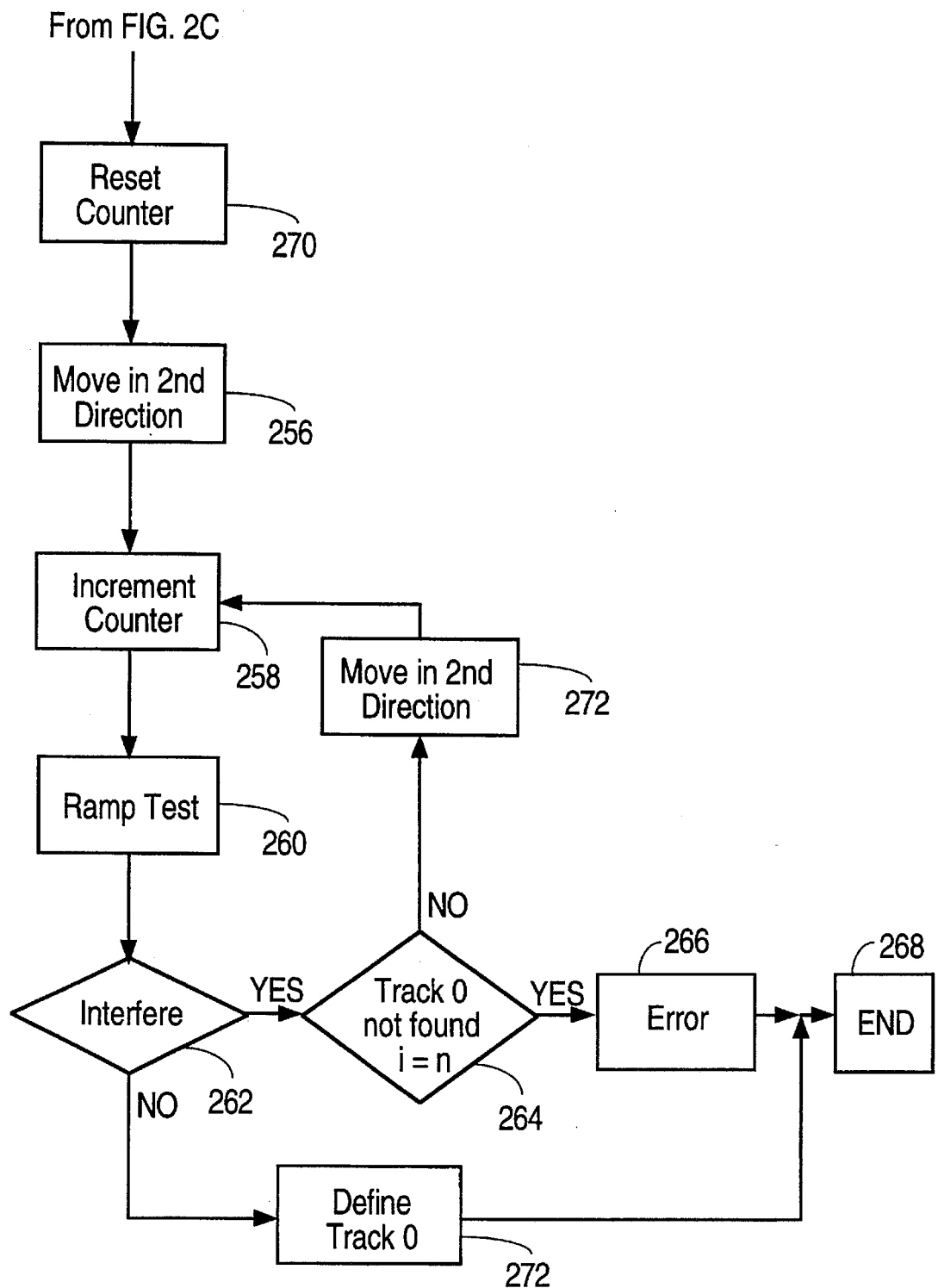

In interference check step 210, the result for each magnetic head in step 208 is checked. If each magnetic head successfully read the written pattern, processing transfers to reset counter step 209. After step 209 resets the counters processing transfers though connection 211 to step 228 (FIG. 2C). If one or more magnetic heads failed to successfully read the written pattern, either one of more of the heads are defective, or one or more of the magnetic heads experienced interference from the stationery loading ramp. Initially, it is assumed that one or more of the magnetic heads experience interference with the stationery loading ramp, and so processing transfers from interference check 210 to a move in second direction step 212 (FIG. 2B).

In reaching step 212, the magnetic heads have been moved in the first direction to an extent that the stationery loading ramp started to unload one or more of the magnetic heads. Consequently, in move in second direction step 212, the magnetic heads are moved a predetermined number of tracks, e.g., n tracks, in the second direction, which is opposite to the first direction and so is away from the stationery loading ramp.

After move in second direction step 212 is completed, increment step 214 increments value i of the counter. While in this embodiment, the counter is incremented, this is illustrative only of maintaining a record of the number of iterations performed and is not intended to limit the invention to an incrementing counter. In view of this disclosure, those skilled in the art will be able to maintain a record of the number of iterations performed in various phases of process 200 in a wide variety of ways.

Processing transfers from increment step 214 to ramp test step 216. In ramp test step 216, each magnetic head again is used to write a pattern on the disk and then each magnetic head is used to read the pattern that the magnetic head wrote. Processing transfers from ramp test step 216 to interference check step 218.

In interference check step 218, the result for each magnetic head in step 216 is checked. If each magnetic head successfully read the written pattern, processing transfers to reset counter step 217. After step 217 resets the counter, processing transfers though connection 219 to step 254 (FIG. 2C). If one or more magnetic heads failed to successfully read the written pattern, either one of more of the heads are defective, or one or more of the magnetic heads still experienced interference from the stationery loading ramp. Consequently, processing transfers from interfere step 218 to bad head check step 220.

In bad head check step 220, value i of the counter is compared with limit m. If value i of the counter equals limit m, processing transfers to bad head step 222 and conversely to move in second direction step 212. The limit m is defined by the number of steps required in the second direction, where each step is n tracks in length, to assure that no magnetic head is encountering interference from the stationery loading ramp. Specifically, while the distance moved in step 206 is intended to place the magnetic heads at about the inner radial edge of the interference zone, limits n and m are selected so that n multiplied by m represents a radial distance greater than the radial width of the possible interference zone. Thus, when the heads have been moved m steps and the ramp test still indicates interference between at least one head and the stationery loading ramp, an error condition exists and one or more of the magnetic heads may be faulty.

When bad head check 220 transfers processing to bad head step 222, bad head step 222 declares that a bad magnetic head has been detected and performs a test to determine which magnetic head or heads is defective. In one embodiment, the test uses each head to write a pattern on the disk and then reads the pattern back. If the signal generated by the pattern read back has a satisfactory amplitude and accuracy, the head is considered good. If the amplitude (envelope) is good, but dropout is detected, there is a media defect. If the amplitude is not acceptable, the head is considered defective. The particular test used to determine the bad magnetic head depends upon the particular type of magnetic head used, and such tests are well-known to those skilled in the art.

Upon completion of the bad head test, processing transfers from step 222 to error step 224. In error step 224, an error condition is generated to signal that an error occurred and that the particular error was that a bad head was detected. Processing transfers from error step 224 to end 226 which terminates the process of this invention.

If bad head check 220 determines that the maximum number of steps m has not been performed, processing returns to step 212, as indicated above. Steps 212, 214, 216, 218, and 220 are repetitively performed until either the maximum number of steps have been performed or no interference is detected in step 218. The steps performed when the maximum number of steps have been performed was described above. When no interference is detected in step 218, processing transfers to step 217, which resets the counter, and in turn transfers through connection point 219 to step 254 (FIG. 2C), which is described more completely below.

Recall that the portion of process 200 defined by steps 212 through 226 was entered because when step 206 moved the magnetic heads to the possible interference zone and ramp test 208 was performed, interference check step 210 detected interference between at least one magnetic head and the stationery loading ramp. Conversely, if no interference was detected in step 210, processing transferred through point 211 to move in first direction step 228 (FIG. 2C).

In move in first direction step 228, the magnetic heads are moved a predetermined distance in the first direction, e.g., about 10 tracks radially towards the outer diameter of the disk. Processing transfers from move in first direction step 228 to increment counter step 230.

In increment counter step 230, value i of the counter is incremented and processing transfers to ramp test 232. The counter is used to determine, as explained more completely below, that an error has occurred because the stationery loading ramp has not been encountered.

Ramp test 232 performs the same operations as described above for ramp test 208 and that description is incorporated herein by reference. Upon completion of ramp test 232, interference check step 234 determines whether any magnetic head interacted with the stationery loading ramp.

If interference check step 234 does not detect interference, the magnetic heads have not yet been moved in close proximity to the stationery loading ramp or an error condition exists. Ramp not found test 236 determines which of these possibilities is correct. Specifically, ramp not found test 236 compares value i of the counter to the first limit m. If value i is less than first limit m, processing transfers to move in first direction step 228. Conversely, if value i equals first limit m, processing transfers to error step 238.

The limit m is defined by the number of steps required in the first direction, where each step is n tracks in length, to assure that a magnetic head should encounter interference from the stationery loading ramp. Specifically, while the distance moved in step 206 is intended to place the magnetic heads at about the inner of edge of the interference zone, limit m is selected so that m multiplied by n represents a radial distance greater than the radial width of the possible interference zone. Thus, when the magnetic heads have been moved m steps and the ramp test still indicates no interference between at least one head and the stationery loading ramp, the stationery loading ramp, was not detected.

When ramp not found check 236 transfers processing to error step 238, an error condition is generated to signal the process that an error occurred and that the particular error was that the ramp could not be found. Processing transfers from error step 238 to end step 240 which terminates the process of this invention.

If ramp not found check 236 determines that the maximum number of steps m has not been performed, processing returns to step 228, as indicated above. Steps 228, 230, 232, 234, and 236 are repetitively performed until either the maximum number of steps have been performed or interference is detected in step 234. The steps performed when the maximum number of steps have been performed was described above. When interference is detected in step 234, processing transfers to step 242.

In step 242, value i of the counter is reset to the initial value for the fine seek to the position where ramp interference with the magnetic heads is observed and processing transfers to step 244. In step 244, the magnetic heads are moved n tracks in the second direction, e.g, towards the center of the disk. This positions the magnetic heads for the start of the fine adjustment.

Upon completion of step 244, increment counter step 246 increments value i of the counter. Processing transfers from increment counter step 246 to ramp test step 248. In ramp test step 248, each magnetic head again is used to write a pattern on the disk and then each magnetic head is used to read the pattern that the magnetic head wrote. Processing transfers from ramp test step 248 to interference check step 250.

In interference check step 250, the result for each magnetic head in step 248 is checked. If each magnetic head successfully read the written pattern, processing transfers to ramp not found step 252 from step 250 (FIG. 2B). If one or more magnetic heads failed to successfully read the written pattern, one or more of the magnetic heads experienced interference with the stationery loading ramp. Consequently, processing transfers from interference check 250 to step 256 (FIG. 2D), which is described more completely below.

If interference check 250 does not detect interference, the magnetic heads have not yet been moved back to close proximity of the stationery loading ramp or an error condition exists. Ramp not found test 252 determines which of these possibilities is right. Specifically, ramp not found test 252 compares value i of the counter to 1.5 times second limit n, i.e., 1.5 n, where n is the number of tracks per coarse seek step. If value i is less than 1.5 n, processing transfers to move in first direction step 254. Conversely, if value i equals 1.5 n, processing transfers to error step 238, that was described above.

The value of 1.5 n is used in step 252 because the previous coarse seeks of step size n tracks were used to detect interference with the stationery loading ramp. Interference was detected within the last coarse seek of n tracks. Thus, interference should be again detected within 1.5 n tracks.

If ramp not found check 252 determines that the maximum number of 1.5 n steps has not been performed, processing goes to move in first direction step 254, which moves the magnetic heads a predetermined distance in the first direction, e.g., one track in this embodiment. Also, notice that when interference was detected in step 210 and subsequently eliminated in steps 212 to 220, processing transferred to step 254 through connection point 219.

Steps 254, 246, 248, 250, and 252 are repetitively performed until either the maximum number of steps have been performed or interference is detected in step 250. The steps performed when the maximum number of steps have been performed was described above. When interference is detected in step 250, processing transfers to reset counter step 270 (FIG. 2D), which resets the counter and then transfers processing to step 256.

In move in second direction step 256, the magnetic heads are moved a predetermined number of tracks radially inward, e.g., about 10 to 100 tracks, preferably about 20 to 50 tracks, and in one embodiment about 25 tracks. The distance moved is dependent on the mechanical tolerance associated with disk drive operation such as thermal expansion and disk runout. Processing transfers from move in second direction step 256 to increment counter step 258.

In increment counter step 258, value i of the counter is incremented and processing transfers to ramp test 260. Ramp test 260 performs the same operations as described above for ramp test 208 and that description is incorporated herein by reference. Upon completion of ramp test 260, interference check 262 determines whether any magnetic head interacted with the stationery loading ramp.

If interference check 262 detects interference, the magnetic heads have not yet been moved from close proximity to the stationery loading ramp or an error condition exists. Track zero not found test 264 determines which of these possibilities is right. Specifically, track zero found test 264 compares value i of the counter to the second limit n. If value i is less than second limit n, processing transfers to move in second direction step 256. Conversely, if value i equals second limit n, processing transfers to error step 266.

When the heads have been moved n tracks and the ramp test still indicates interference between at least one head and the stationery loading ramp, the results are contradictory with the earlier steps in process 200. Thus, when track zero not found check 264 transfers processing to error step 266, an error condition is generated to signal the process that an error occurred and the particular error was that track zero was not found. Processing transfers from error step 266 to end step 268 which terminates the process of this invention.

If track zero not found check 264 determines that the maximum number of steps n has not been performed, processing goes to move in second direction step 272. Move in second direction step 272 moves the magnetic heads a predetermined distance, e.g., one track, in the second direction, and transfers processing to step 258.

Steps 272, 258, 260, 262, and 264 are repetitively performed until either the maximum number of steps have been performed or no interference is detected in step 262. The steps performed when the maximum number of steps have been performed was described above. When no interference is detected in step 262, processing transfers to define track zero step 272.

In step 272, the process is informed that the optimal position to locate absolute track zero has been found, i.e., the current position of the magnetic head. Processing transfers from step 272 to end step 268. In one embodiment, physical track zero is defined as absolute track 8 to provide utility tracks at the outer circumference of the disk.

Unlike prior art processes that placed track zero at the same location in each disk drive, process 200 of this invention locates track zero a given number of tracks radially in from the stationary loading ramp. Consequently, the storage capacity of the disk drive is enhanced without comprising yields or reliability. Moreover, process 200 always gives the optimal storage capacity independent of the mechanical manufacturing tolerances. One embodiment of the present invention has been described herein. This embodiment is illustrative only and is not intended to limit the invention to that embodiment.

We claim:

1. A method for optimizing the storage capacity of a disk drive comprising the steps of:

moving a transducer in first predetermined increments in a first direction over a disk;

measuring after each first predetermined increment whether a mechanical component of said disk drive interfered with movement of said transducer in said first direction; and defining a reference track zero after detection of interference by said mechanical component with movement of said transducer in said first direction wherein in servo formatting of said disk, said reference track zero is a starting reference track for said servo formatting.

2. The method for optimizing the storage capacity of a disk drive of claim 1 wherein said step of defining a reference track zero further comprises:

A) moving said transducer said first predetermined increment in a second direction wherein said second direction is opposite to said first direction.

3. The method for optimizing the storage capacity of a disk drive of claim 2 wherein said step of defining a reference track zero further comprises:

B) moving said transducer in said first direction in second predetermined increments.

4. The method for optimizing the storage capacity of a disk drive of claim 3 wherein said step of defining a reference track zero further comprises:

C) measuring after each second predetermined increment in said first direction whether said mechanical component of said disk drive interfered with movement of said transducer in said first direction.

5. The method for optimizing the storage capacity of a disk drive of claim 4 wherein said step of defining a reference track zero further comprises:

D) moving said transducer in said second direction a third predetermined increment upon measuring step C) determining that said mechanical component of said disk drive interferes with movement of said transducer.

6. The method for optimizing the storage capacity of a disk drive of claim 5 wherein said step of defining a reference track zero further comprises:

E) measuring whether said mechanical component interferes with said transducer and (i) if interference is detected, continuing with said defining a reference track zero; and (ii) if no interference is detected defining the position of said transducer as said reference track zero.

7. The method for optimizing the storage capacity of a disk drive of claim 6 wherein said step of continuing with said defining a reference track zero further comprises:

F) moving said transducer in said second direction in said second predetermined increments, and measuring after each second predetermined increment in said second direction whether said mechanical component of said disk drive continues to interfere with said transducer and upon determining that said mechanical component of said disk drive no longer interferes with movement of said transducer defining the position of said transducer as said reference track zero.

8. The method for optimizing the storage capacity of a disk drive of claim 1 wherein said first predetermined increment comprises a step of n tracks.

9. The method for optimizing the storage capacity of a disk drive of claim 1 wherein said mechanical component comprises a stationery loading ramp used for dynamic head loading.

10. A method for optimizing the storage capacity of a disk drive comprising the steps of:

A) moving a transducer a first predetermined increment in a first direction over a disk;

B) measuring whether a mechanical component of said disk drive interfered with movement of said transducer in said first direction;

C) performing step D) if interference is not detected in step B) and otherwise branching to step F)

D) repeating steps A) and B) until step B) detects interference with movement of said transducer in said first direction;

E) defining a reference track zero after detection of interference by said mechanical component with movement of said transducer in said first direction;

F) moving said transducer a second predetermined increment in a second direction wherein said second direction is opposite to said first direction;

G) measuring whether said mechanical component of said disk drive continues to interfere with said transducer;

H) repeating steps F) and G) until step G) detects no interference with said transducer; and I) defining said reference track zero after detection of no interference wherein in servo formatting of said disk, said reference track zero is a starting reference track for said servo formatting.

11. A method for optimizing the storage capacity of a disk drive as in claim 10 wherein step E) further comprises:

i) moving said transducer a second predetermined increment in said second direction.

12. A method for optimizing the storage capacity of a disk drive as in claim 11 wherein step E) further comprises:

ii) moving said transducer a third predetermined increment in said first direction.

13. A method for optimizing the storage capacity of a disk drive as in claim 12 wherein step E) further comprises:

iii) measuring whether said mechanical component of said disk drive interfered with movement of said transducer in said first direction.

14. A method for optimizing the storage capacity of a disk drive as in claim 13 wherein step E) further comprises:

iv) repeating steps ii) and iii) until step iii) detects interference with movement of said transducer in said first direction.

15. A method for optimizing the storage capacity of a disk drive as in claim 14 wherein step E) further comprises:

v) moving said transducer a fourth predetermined increment in said second direction.

16. A method for optimizing the storage capacity of a disk drive as in claim 15 wherein step E) further comprises:

vi) moving said transducer a fifth predetermined increment in said :second direction.

17. A method for optimizing the storage capacity of a disk drive as in claim 16 wherein step E) further comprises:

vii) measuring whether said mechanical component of said disk drive continues to interfere with movement of said transducer.

18. A method for optimizing the storage capacity of a disk drive as in claim 17 wherein step E) further comprises:

viii) repeating steps vi) and vii) until step vii) detects no interference with said transducer and upon detection of no interference defining the position of said transducer as said reference track zero.

19. A method for optimizing the storage capacity of a disk drive as in claim 11 wherein said first and second predetermined increments are n tracks.

20. A method for optimizing the storage capacity of a disk drive as in claim 15 wherein said fourth predetermined increment is in the range of about 10 to 100 tracks.

21. A method for optimizing the storage capacity of a disk drive as in claim 16 wherein said third and fifth predetermined increments are one track.

22. A method for optimizing the storage capacity of a disk drive as in claim 11 wherein step I) further comprises:

i) moving said transducer a third predetermined increment in said first direction.

23. A method for optimizing the storage capacity of a disk drive as in claim 22 wherein step I) further comprises:

ii) measuring whether said mechanical component of said disk drive interfered with movement of said transducer in said first direction.

24. A method for optimizing the storage capacity of a disk drive as in claim 23 wherein step I) further comprises:

iii) repeating steps i) and ii) until step ii) detects interference with movement of said transducer in said first direction.

25. A method for optimizing the storage capacity of a disk drive as in claim 24 wherein step I) further comprises:

iv) moving said transducer a fourth predetermined increment in said second direction.

26. A method for optimizing the storage capacity of a disk drive as in claim 25 wherein step I) further comprises:

v) moving said transducer a fifth predetermined increment in said second direction.

27. A method for optimizing the storage capacity of a disk drive as in claim 26 wherein step I) further comprises:

vi) measuring whether said mechanical component of said disk drive continues to interfere with movement of said transducer.

28. A method for optimizing the storage capacity of a disk drive as in claim 27 wherein step I) further comprises:

vii) repeating steps v) and vi) until step vi) detects no interference with said transducer and upon detection of no interference defining the position of said transducer as said reference track zero.

29. A method for optimizing the storage capacity of a disk drive as in claim 25 wherein said fourth predetermined increment is in the range of about 10 to 100 tracks.

30. A method for optimizing the storage capacity of a disk drive as in claim 26 wherein said third and fifth predetermined increments are one track.

31. A method for optimizing the storage capacity of a disk drive comprising the steps of:

A) defining a physical reference point;

B) moving a transducer in coarse steps in a first direction from said physical reference point;

C) measuring after each coarse step in said first direction whether a mechanical component of said disk drive interfered with movement of said transducer in said first direction;

D) moving said transducer in a second direction opposite to said first direction;

E) moving said transducer in fine steps in said first direction;

F) measuring after each fine step in said first direction whether said mechanical component of said disk drive interfered with movement of said transducer in said first direction; and G) moving said transducer in a predetermined distance in said second direction upon measuring step F) detecting interference with said transducer and defining a reference track zero wherein in servo formatting of said disk said reference track zero is a starting reference track for said servo formatting.

* * * * *